E. J. LEES.
DRILL MACHINE.
APPLICATION FILED MAR. 19, 1915.
1,339,461.
Patented May 11, 1920.
2 SHEETS—SHEET 1.
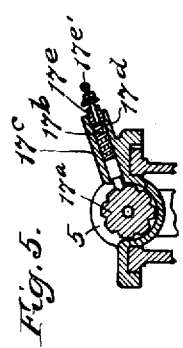
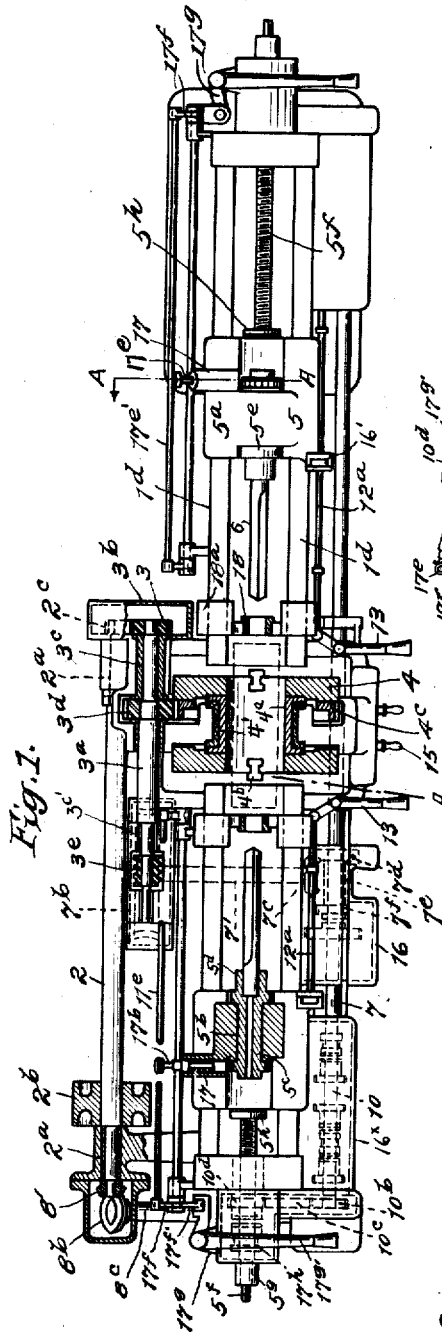
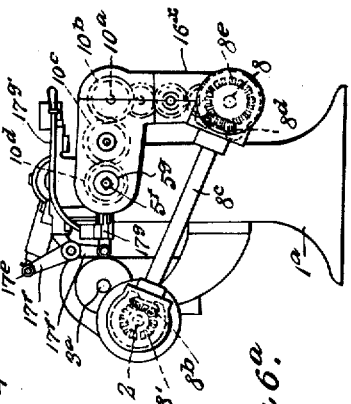
Witnesses
Geo. B. Pitts
Jennie Tyers
Ernest J. Lees
Inventor
By
Attorney E. J. LEES.
DRILL MACHINE.
APPLICATION FILED MAR. 19, 1915.
1,339,461.
Patented May 11, 1920.
2 SHEETS—SHEET 2.
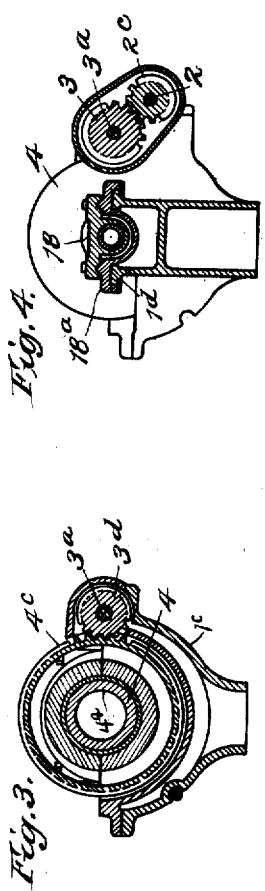
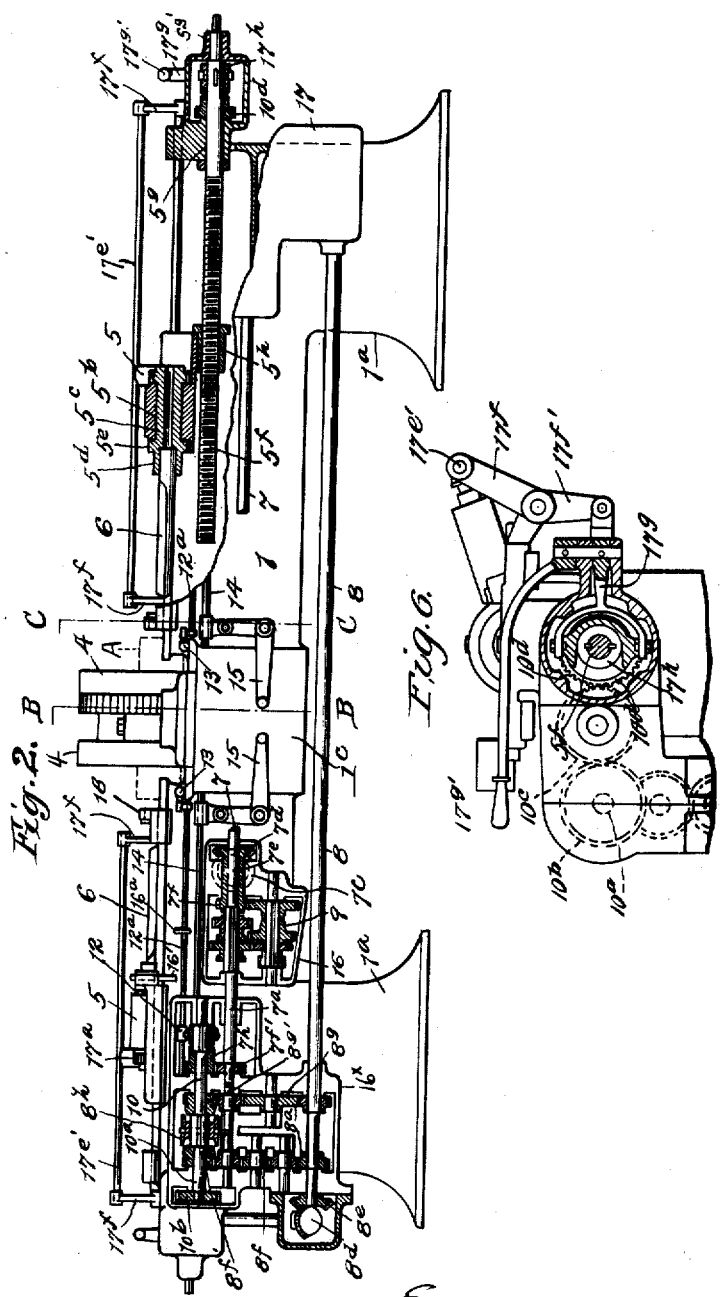
Witnesses
Geo. B. Pitts
Jennie Tyers
Ernest J. Lees
Inventor

UNITED STATES PATENT OFFICE.

ERNEST J. LEES, OF CLEVELAND, OHIO, ASSIGNOR TO THE LEES-BRADNER COMPANY, OF CLEVELAND, OHIO, A CORPORATION OF OHIO.

DRILL-MACHINE.

1,339,461.   Specification of Letters Patent.   Patented May 11, 1920.

Application filed March 19, 1915. Serial No. 15,457.

*To all whom it may concern:*

Be it known that I, ERNEST J. LEES, a citizen of the United States, residing at Cleveland, in the county of Cuyahoga and State of Ohio, have invented certain new and useful Improvements in and Relating to Drill-Machines, of which the following is a specification.

This invention relates to drill machines and particularly to machines for drilling a hole or holes through a piece or section of material. The invention is particularly useful in drilling holes endwise through bars or sections of material.

In machines as heretofore constructed it was customary to use one drill which would drill the hole entirely through the material in one direction. Where the piece of material, such as a billet, was to be drilled, it necessitated the use of a very long drilling tool. The long drilling tool had many disadvantages; namely, the drill on account of its length was unable to withstand the torsional strain while in operation; again, to avoid breakage, its forward feed was exceedingly slow; it was impossible, especially when the drill was relatively small in cross section, to secure proper flow of the oil or lubricant to the free end of the tool, and the discharge of the oil or lubricant from the tool together with the metal chips without clogging the flow of the oil, stopping the drill and perhaps snapping the latter in two.

In other types of machines, of which I am aware, only one drill was used. In this latter type of machine a hole approximately half way through the piece of material was drilled from one side thereof and then the piece of material was turned half way around whereby the remaining portion of the hole was drilled from the opposite side of the piece of material. This form of construction required extra time and labor to drill a complete hole.

Furthermore, in all machines of which I am aware, including the types of machines just referred to, the tool is rotated to drill the hole. As the drill moves inwardly, its free end has a tendency to deflect laterally from a line extending axially of the drill. Where the drill is relatively long, this deflection becomes very great at the far end of the material; and where the hole is partly drilled from one side of the material and the material is then turned around and the hole completed from its opposite side, the inner ends of the holes not only do not aline with each other, but this deflection becomes twice as great as the deflection of the drill laterally is always in the same direction.

One object of my invention is to provide a drill machine capable of drilling a hole through a piece of material in a rapid manner.

Another object of the invention is to provide a drill machine in which the parts are correlated to drill a hole through a piece of material by the use of relatively short drills.

Another object of the invention is to correlate the parts of the apparatus in such manner that the drills may operate upon opposite sides of the work simultaneously to drill a hole entirely therethrough in line with the axes of the drills.

Another object of the invention is to reduce all strains and stress upon the drills to a minimum.

A further object of the invention is to provide novel means for throwing out the feeding means for the tool carrier.

A further object of the invention is to provide novel means for stopping the feeding movement of each drill when the latter becomes inoperative.

With these and other objects in view, the invention consists of the parts hereinafter described and set forth in the appended claims.

For the purpose of illustration I have, in the accompanying drawings, shown and herein described one form of mechanism embodying my invention.

Figure 1 is a top plan view of a machine embodying my invention, parts being broken away.

Fig. 2 is a side elevation, partly in section of the machine.

Fig. 3 is a section on the line B—B of Fig. 2.

Fig. 4 is a section on the line C—C of Fig. 2.

Fig. 5 is a section on the line A—A of Fig. 1.

Fig. 6 is a fragmentary end view, partly in section, showing one of the throw-out clutches.

Fig. 6ª is an end elevation of the machine.

In the drawings, 1 indicates as an entirety a suitable frame which may be cast or otherwise formed in one or more sections of any required size and dimensions. The frame 1 is preferably supported by a plurality of standards 1ª.

2 indicates a main driving shaft, which is mounted in bearings 2ª, 2ª, arranged at one side of the frame 1. 2ᵇ indicates a pulley secured to the shaft 2 and adapted to receive power from any suitable source. 2ᶜ indicates a change gear mounted on one end of the shaft 2, and meshing with a change gear 3 fixed to a counter shaft 3ª. 3ᵇ indicates a casing or box provided on the frame 1 and having a cover plate to permit access to the gears 2ᶜ, 3. The shaft 3ª is mounted in suitable bearings, 3ᶜ, 3ᶜ′. 3ᵈ, 3ᵉ, indicate two gears, preferably a spur gear and a worm, respectively, fixed to the countershaft 3ª. The purpose of these gears will be later described.

4 indicates a hollow chuck rotatably mounted in bearings 4′ upon the frame 1 in any suitable manner. The frame 1 may be enlarged and otherwise strengthened, as shown at 1ᶜ, to provide a suitable support and bearing for the chuck 4. The opening 4ª through the chuck 4 is disposed axially thereof and is adapted to receive and support a piece or stock of material, such as a billet A, through which a hole is to be drilled, in a manner to permit drilling at opposite ends thereof simultaneously. 4ᵇ indicates a plurality of jaws preferably arranged upon opposite sides of the chuck or work holder 4 and adapted to secure the material to the chuck in a manner well known to those skilled in this art. 4ᶜ indicates a gear surrounding the chuck 4 and arranged to mesh with the gear 3ᵈ, whereby the chuck will be rotated.

The gear 3ᵈ is preferably detachably mounted on the shaft 3ª.

5, 5, indicate as entireties the mechanisms arranged upon opposite sides of the chuck or work holder 4 for drilling a hole from end to end through the piece of material A. The drill mechanisms 5, 5, are alike in construction and operation; hence it will be sufficient if only one of them is described, as follows:

5ª indicates a carrier having suitable shoes or ways arranged to slide upon a pair of guides 1ᵈ supported upon or forming part of the frame 1. The carrier 5ª is formed with a longitudinally extending opening 5ᵇ. 5ᶜ indicates a tool holder or support which is mounted in the opening 5ᵇ. The end of the holder 5ᶜ adjacent the chuck 4 is provided with a socket 5ᵈ to removably receive the drill or other tool 6. The tool support 5ᶜ may be provided with a collar or annular member 5ᵉ, which takes the thrust of the support incident to the drilling operation, as the carrier 5ª moves forwardly.

The support 5ᶜ is preferably rotatably mounted in the opening 5ᵇ for a purpose to be later described. 5ᶠ indicates a feed screw or shaft mounted at one end in suitable bearings 5ᵍ, 5ᵍ′. The shaft or feed screw 5ᶠ is arranged below the carrier 5ª; it engages with a nut 5ʰ, fixed to the carrier 5ª, and thereby moves the carrier forwardly or rearwardly, relative to the adjacent face of the chuck 4, according to the direction of rotation of the screw 5ᶠ.

7, 8, indicate driven shafts extending longitudinally of the frame 1 and adapted to transmit power through separate drive connections 7ª, 8ª, for each carrier 5ª to operate the carriers 5ª independently or simultaneously, as desired; the shaft 7 and its drive connections 7ª being arranged to feed the carrier 5ª forwardly during the drilling operation and the shaft 8 and its drive connections 8ª being arranged to move the carrier 5ª into and out of position for drilling. This construction and arrangement is the preferred form of the invention since it permits the feeding of the carrier 5ª, through a change speed mechanism, indicated as an entirety at 9, to be fed forwardly during drilling at any desired speed according to the nature and character of the work being done at any time and the return movement of the carrier and its positioning against the work at a fast speed without delay or adjustment of parts and connections.

10 indicates a driven shaft which is mounted in bearings 10ª preferably upon the same side of the frame 1 as the shafts 7, 8. At one end, the shaft 10 carries a gear 10ᵇ; the gear 10ᵇ meshes with an idler 10ᶜ, which in turn meshes with a gear 10ᵈ mounted on the adjacent feed shaft 5ᶠ. As will be understood, the gears 10ᵇ, 10ᶜ and 10ᵈ transmit the motion of shaft 10 to the feed screw 5ᶠ, as will be later described, accordingly as the latter is driven fast or slow and in one direction or the other, from the shafts 7, 8.

7′ indicates a shaft mounted in suitable bearings in the frame and extending transversely thereof, as shown in Fig. 2. At one end, the shaft 7′ is provided with a worm gear 7ᵇ, which meshes with the worm 3ᵉ; at its opposite end it is provided with a bevel gear 7ᶜ, which engages with and drives a bevel gear 7ᵈ fixed to a shaft 7ᵉ. 7ᶠ indicates a gear fixed to the shaft 7ᵉ and meshing with one element of the change speed mechanism 9 which serves to drive the shaft 7 at the speed to which it is set or adjusted. The shaft 7ᵉ is preferably a sleeve loosely mounted on the shaft 7.

The drive connections 7ª, for each carrier preferably comprise a gear 7'' fixed to the adjacent end of the shaft 7, a gear 7ʰ loosely mounted on the shaft 10 and meshing with the gear 7'', and a clutch 12 splined to and movable on the shaft 10, whereby the shaft 10 may be driven when the clutch 12 is connected to the gear.

The clutch 12 may be of any suitable construction. It is preferably connected to and operated by an endwise movable rod 12ª, which in turn may be manually operated by a bell crank lever 13.

8' indicates a gear fixed to the main shaft 2 and arranged to mesh with and drive a gear 8ᵇ. The gear 8ᵇ is fixed to one end of a shaft 8ᶜ, which carries at its opposite end a gear 8ᵈ. The gear 8ᵈ meshes with and drives a gear 8ᵉ which is fixed to the shaft 8. The gears 8', 8ᵇ, 8ᵈ, and 8ᵉ and the shaft 8ᶜ, serve to drive the shaft 8 at a constant, relatively fast speed.

The drive connections 8ª preferably comprise two trains of gears 8ᶠ, 8ᵍ, between the shaft 8 and the shaft 10 and continuously driven thereby, and a double clutch 8ʰ splined to the shaft 10. One gear 8'', 8ᵍ' of each train 8ᶠ, 8ᵍ, respectively, is loosely mounted on the shaft 10, and provided with a clutch surface arranged to be engaged by the adjacent clutch surface of the clutch 8ʰ. The clutch 8ʰ is movable into engagement with either of said gears 8'', 8ᵍ', and when so operated transmits the motion of the shaft 8 through one of said gear trains to the shaft 10. As will be understood from the drawings, one of the gear trains 8ᶠ, 8ᵍ, is provided with an extra idler so that the gears 8'', 8ᵍ', rotate in opposite directions. By this construction the shaft 10 can be driven in either direction accordingly as the clutch 8ʰ engages one or the other of the gears 8'', 8ᵍ', and thus effect, through the screw 5ᶠ, rapid movement of the carrier toward and from the work A. The clutch 8ʰ may be connected to a rod 14 which in turn is connected to and operated by a lever 15.

The drive shaft 8 and its connections 8ª serve to rotate the shaft 10 at a fast speed so that the carrier can be moved rearwardly, or forwardly to position the drill for operation, very rapidly. This arrangement is advantageous since it permits the feeding means for the carrier during drilling to be set at the required speed and allows the carrier 5ª to be moved into and out of position without affecting the forward feeding means. It will thus be seen that this arrangement tends to facilitate the rapid and easy operation of the machine.

It will be understood that there is a driven shaft 10 at each end of the machine and separate drive connections, 7ª, 8ª, between the shafts 7, 8, respectively and the adjacent shaft 10, so that each carrier can be controlled independently of the other carrier.

The change speed mechanism 9 and the drive connections 7ª, 8ª for each carrier 5ª may be inclosed in gear boxes 16, 16ˣ, respectively.

I prefer to provide means for automatically stopping the forward feed of each carrier at any predetermined position whereby the drilling operation at either side of the work can be stopped at any desired point. The primary purpose of this construction and arrangement is to prevent the drills from drilling through the piece of work A and contacting with each other. The means for stopping the forward feed of each carrier preferably comprises a pair of engaging members 16', 16ª, carried by the carrier 5ª and the adjacent clutch operating rod 12ª, respectively. The member 16ª is adjustably mounted upon the rod 12ª. The member 16' is preferably detachably secured to the carrier 5ª and so disposed thereon that it will engage with the member 16ª as the carrrier moves forwardly. In operation as the carrier moves forwardly, it engages with the member 16ª and thereby shifts the rod 12ª endwise and releases the clutch 12. As a result of this operation the carrier is arrested and thereafter the operative can operate the adjacent lever 15 to throw in the double clutch 8ʰ and cause the movement of the carrier rearwardly on the ways 1ᵈ.

In the event that either of the tools or drills 6 becomes inoperative, that is, gets caught in the work or becomes clogged by reason of the inefficient discharge of the lubricant and metal chips, or otherwise, I provide devices, for each carrier indicated as an entirety at 17, which automatically stop the feed of the adjacent carrier 5ª, and prevent breakage of the drill or other damage to the apparatus. Of the stopping devices 17, 17ª indicates a member having one or more projections—preferably a ratchet wheel—fixed to the drill support 5ᵉ and arranged to move therewith. 17ᵇ indicates a plunger slidably mounted in a tubular member 17ᶜ supported on or formed integrally with walls of the adjacent carrier 5ª. 17ᵈ indicates a spring, preferably coiled around the plunger. At one end the spring 17ᵈ bears against a collar 17ᵉ which fits the outer end of the tubular member 17ᶜ; at its inner end the spring acts on an enlargement of the plunger 17ᵇ and serves to move it endwise and normally maintain it in yielding engagement with a projection or tooth of the adjacent ratchet wheel 17ª. As a result of this arrangement the plunger 17ᵇ normally prevents rotation of the tool holder 5ᶜ during the drilling; but in the event the drill 6 becomes inoperative and is carried around with the work A, for any reason, it rotates the holder or support 5ᶜ and the ratchet wheel 17$^a$, which in turn forces the plunger outwardly or endwise in opposition to the spring 17$^d$.

17$^{e\prime}$ indicates a member, such as a bar, which extends longitudinally of the frame 1 and parallel to the direction of movement of each carrier 5$^a$. Each bar 17$^{e\prime}$ is supported at its opposite ends by a pair of brackets 17$^f$, which are pivoted in any suitable manner on the frame 1 and permit the bar 17$^{e\prime}$ to swing toward and from the adjacent carrier 5$^a$. Each outer bracket 17$^f$ is provided with an arm 17$^{f\prime}$, which is connected to one arm of a bell crank lever 17$^g$. 17$^h$ indicates a clutch which is interposed between the adjacent gear 10$^d$ and the feed screw 5$^f$. The clutch 17$^h$ is splined to the shaft 5$^f$. It is connected to the opposite arm of the bell crank lever 17$^g$ and arranged to be moved thereby into and out of engagement with the gear 10$^d$. The gear 10$^d$ is loosely mounted upon the shaft 5$^f$, so that when the clutch 17$^h$ is disconnected therefrom the power of shaft 10 is not transmitted to the feed screw 5$^f$.

As shown in the drawings, the member 17$^{e\prime}$ is normally arranged in a position to be engaged by the plunger 17$^b$ whenever it is moved outwardly irrespective of the position of the carrier 5$^a$; hence in operation when the plunger is operated by one or more teeth of the ratchet wheel 17$^a$, it will engage with the bar 17$^{e\prime}$ and through it and the brackets 17$^f$ and lever 17$^g$ actuate the clutch 17$^h$ to disconnect the gear 10$^d$ from the shaft 5$^f$, whereupon the feed screw will be stopped.

It will be understood from the foregoing description that I have provided separate drill mechanisms for operating independently or simultaneously upon opposite ends of the work A. This construction and arrangement permit the drills to operate simultaneously to drill holes in the work in axial alinement with each other so that when they merge into one another a complete hole will be formed through the piece of work in approximately one-half the time required to drill the hole from one end of the work or by a single drill operating substantially half way through the work at a time. My construction and arrangement has the further advantage of permitting the use of relatively short drills which are capable of withstanding the torsional strains incident to drilling to a greater extent than relatively long drills such as are required when drilling from one end of the pieces of work.

While I have provided two driving shafts, 7, 8, for both drilling mechanisms 5, 5, one of which shafts, 7, by means of interposed change speed gear mechanism serves to feed the carriers at different speeds as desired, and the other of which shafts, 8, serves to traverse the carriers rapidly toward and from the work, it will be noted that I have provided separate driving connections 7$^a$, 8$^a$, between the shafts 7, 8, respectively and each drill mechanism 5, so that the latter can be controlled in either direction independently of each other; thus, the carriers can be moved toward each other, or away from each other, simultaneously or either can be moved away from the work while the other is being fed toward it. This arrangement permits the tools to drill the work from opposite ends simultaneously and also permits either tool to be moved out of drilling position at will in the event either tool is made inoperative or when it becomes necessary to move one drill rearwardly and permit the other drill to complete the hole. For this latter purpose, the carriers are each mounted to move beyond a point midway between two sides of the workholder, so that when the drills have approached each other to a point near the center of the work, one of them may be moved out of drilling position while the other continues drilling until the hole drilled thereby merges into the hole drilled by the other drill.

It will also be understood that I have provided separate automatic throw-out devices 16$^\prime$, 16$^a$ for each carrier 5$^a$ and separate devices 17 for stopping the feed of each carrier when the tool 6 mounted thereon becomes inoperative. As a result of this construction each carrier will be stopped automatically at any time its tool becomes inoperative or at any predetermined position independently of the other carrier.

It will be further noted that in the preferred form of the invention the holder for the work is rotated while the drills are held stationary in their carriers. This form of construction is advantageous in that it prevents any lateral deflection of the drills at their free ends during the drilling operation and effects proper coöperation between the drills to form a hole entirely through the piece of work in line with its axis and the axes of the drills.

The operating levers 13 and 15, which control the forward feed of the tool during the drilling and the traversing of the carrier into and out of drilling position, respectively, are preferably arranged adjacent to each other near the central portion of the frame 1 so that the operative can conveniently control the operation of the carriers in any required manner. The clutches 8$^h$ are preferably of the cup and cone type so that upon the release of the levers 15 by the operative, the clutches will automatically disengage themselves from the gears with which they have been connected.

17$^{g\prime}$ indicates a handle which is connected to the lever 17$^g$ and permits manual operation of the clutch 17$^h$ when desired.

18 indicates guides preferably provided to guide the free ends of the tools 6. Each guide 18 comprises a sleeve member mounted upon a stationary frame 18ª, that is fixed in any suitable manner to the adjacent ways 1ᵈ. The frame 18ª is detachably mounted on the ways 1ᵈ and may be adjusted therealong so as to position the guide 18 in close proximity to the adjacent end of the piece of work A and thus cause the free end of the tool 6 to properly engage therewith.

To those skilled in the art of making mechanism of the class described, many alterations in construction and widely differing embodiments and applications of my invention will suggest themselves, without departing from the spirit and scope of the claims. My disclosures and the descriptions herein are purely illustrative and are not intended to be in any sense limiting, except as required by the scope of the appended claims.

Since each drill is relatively short and therefore capable of resisting effectively torsional strains, it can be moved forwardly during the drilling operation approximately twice as fast as is possible where one relatively long drill is used, and as both drills operate simultaneously, a complete hole can be drilled in about one fourth the time heretofore required. It will therefore be seen that my apparatus is capable of operating at maximum speed and is especially advantageous in drilling holes endwise through long pieces of work.

What I claim is:

1. In a machine of the character described, the combination of a support, a rotatable holder for holding a piece of work, a drill slidably mounted upon said support axially of the hole to be drilled through the piece of work, means for feeding the drill toward the piece of work, means for rotating said workholder, and means, including a rotatable member and a plunger operated thereby for throwing out the feeding means for said drill when the latter becomes inoperative.

2. In a machine of the class described, the combination of a support, a work holder rotatably mounted thereon, a carrier movable on said support toward and from said work holder and arranged to rotatably support a drill, said drill being normally stationary on said carrier, means for rotating said work holder, means for moving said carrier toward said work holder, and means, including a device actuated by the rotation of said drill on said carrier and a plunger operated by said device, for stopping the carrier in its forward movement.

3. In a machine of the class described, the combination of a support, a work holder rotatably mounted thereon, a carrier movable on said support toward and from said work holder and arranged to rotatably support a drill, said drill being normally stationary on said carrier, means for rotating said work holder, means including a clutch for moving said carrier toward said work holder, and means, including a device actuated by the rotation of said drill on said carrier and a plunger operated by said device, for throwing out said clutch and stopping the carrier in its forward movement.

4. In a machine of the character described, the combination of a support, a holder for holding a piece of work rotatably mounted thereon, means for rotating said work holder, a carrier movable on said support toward and from said work holder, a member movably mounted on the carrier and arranged to support a tool in position to act on the piece of work when the carrier is moved forwardly, means for operating the said carrier, and devices including a plunger interposed between said movable member and the carrier operating means arranged to be actuated by said member for throwing out said operating means when the tool becomes inoperative.

5. In a machine of the class described, the combination of a support, a work holder rotatably mounted thereon, means for rotatably and slidably supporting a drill on said support to move toward said work holder, means for moving said drill supporting means toward said work holder, means for causing relative angular movement between the drill and said work holder to drill a hole in or through the work on said holder, and means, comprising a rotatable member and a plunger operated thereby constructed and arranged to stop said moving means when the relative movement between the drill and said work holder ceases due to inoperation of the drill.

6. In a machine of the character described, the combination of a support, a rotatable holder for holding a piece of work, a pair of drills slidably mounted upon opposite sides of said holder and axially of the hole to be drilled through the piece of work, means for feeding the drills toward each other, means for rotating said work holder, and means including a rotatable member and a plunger operated thereby for throwing out the feeding means for each of said drills when the latter becomes inoperative.

7. In a machine of the character described, the combination of a support, a rotatable holder for holding a piece of work, a drill slidably mounted upon said support and axially of the hole to be drilled through the piece of work, means for feeding the drill toward said holder, means for rotating said work holder, and means for throwing out the feeding means for said drill when the latter becomes inoperative, the throwing-out means comprising a ratchet wheel and a slidable member engaging with and operated in one direction by the teeth on said wheel.

8. In a machine of the character described, the combination of a support, a rotatable holder for holding a piece of work, a drill slidably mounted upon said support and axially of the hole to be drilled through the piece of work, means for feeding the drill toward said holder, means for rotating said work holder, and means for throwing out the feeding means for said drill when the latter becomes inoperative, the said throwing-out means comprising a frame having a bar common to all positions of the drill, a movable member arranged to engage said bar and a rotatable device operated by said drill for moving said member.

9. In a machine of the character described, the combination of a support, a rotatable holder for holding a piece of work, a pair of drills slidably mounted upon opposite sides of said holder and axially of the hole to be drilled through the piece of work, means for feeding the drills toward each other, means for rotating said work holder, and means for throwing out the feeding means for one of said drills when the latter becomes inoperative, the said means including a rotatable member in which the adjacent drill is supported, and a plunger engaging with and operated in one direction by said member.

10. In a machine of the character described, the combination of a support, a rotatable holder for holding a piece of work, a drill slidably mounted upon said support and axially of the hole to be drilled through the piece of work, means for feeding the drill toward said holder, means for rotating said work holder, and means for throwing out the feeding means for said drill when the latter becomes inoperative, the said means including a frame having a bar common to all positions of the drill, a movable member arranged to engage said bar and a ratchet wheel connected to and operated by said drill for moving said member.

11. In a machine of the character described, the combination of a support, a holder rotatably mounted thereon and arranged to hold a piece of work, means for rotating said work holder, a carrier movable on said support toward and from said work holder, a member movably mounted on the carrier and arranged to support a tool in position to act on the piece of work when the carrier is moved forwardly, and means including a spring retarded device actuated by said movable member for throwing out the carrier moving means when the tool becomes inoperative.

12. In a machine of the character described, the combination of a support, a holder rotatably mounted thereon and arranged to hold a piece of work, means for rotating said work holder, a carrier movable on said support toward and from said work holder, a member movably mounted on the carrier and arranged to support a tool in position to act on the piece of work when the carrier is moved forwardly, means for moving the carrier, and means for throwing out the carrier moving means when the tool becomes inoperative, the said throwing out means including a spring operated plunger and an actuator fixed to said movable member and arranged to operate said plunger.

13. In a machine of the character described, the combination of a support, a holder rotatably mounted thereon and arranged to hold a piece of work, means for rotating said work holder, a carrier movable on said support toward and from said work holder, a member movably mounted on the carrier and arranged to support a tool in position to act on the piece of work when the carrier is moved forwardly, means for operating the said carrier, devices and interposed between said movable member and the carrier operating means and including a spring which holds the said member stationary in said carrier during normal operation of the tool, but permits said devices to throw out the operating means when the tool becomes inoperative.

14. The combination of a rotatable work holder, means for rotating said holder, a carrier movable toward and from said holder, a tool support rotatably mounted in said carrier and provided with a projecting member, means for moving the carrier forwardly, and devices between said tool support and said carrier moving means and including a spring retarded member arranged to be operated by the projecting member for throwing out the carrier moving means.

15. The combination of a rotatable work holder, means for rotating said holder, a carrier movable toward and from said holder, a tool support rotatably mounted in said carrier and provided with a projecting member, means for moving the carrier forwardly and rearwardly, a swingable bar arranged parallel to the path of movement of said carrier, connections between said bar and the carrier moving means for throwing out the latter when the bar is operated, and a spring controlled plunger normally engaging said projecting member and arranged to be actuated thereby to move said bar.

16. In a machine of the class described, the combination of a support, a rotatable holder for a piece of work, means for rotating said workholder, a drill slidably mounted on said support for movement toward said workholder, said drill being normally held against rotation with the work, means for moving said drill, means for throwing out said drill moving means when the drill is rotated by the work, said throwing out means including a movable member arranged parallel to the movement of said drill, and a plunger movable with the drill and arranged to be actuated thereby to operate said movable member.

In testimony whereof I affix my signature, in the presence of two witnesses.

ERNEST J. LEES.

Witnesses:
 CHARLES E. SHORE,
 GEO. B. PITTS.

Correction in Letters Patent No. 1,339,461.

It is hereby certified that in Letters Patent No. 1,339,461, granted May 11, 1920, upon the application of Ernest J. Lees, of Cleveland, Ohio, for an improvement in "Drill-Machines," an error appears in the printed specification requiring correction as follows: Page 6, line 91, claim 13, for the words "devices and" read *and devices;* and that the said Letters Patent should be read with this correction therein that the same may conform to the record of the case in the Patent Office.

Signed and sealed this 31st day of August, A. D., 1920.

[SEAL.]

M. H. COULSTON,

*Acting Commissioner of Patents.*

Cl. 77—21.